United States Patent [19]
Wurst et al.

[11] Patent Number: 5,639,487
[45] Date of Patent: Jun. 17, 1997

[54] MOLD CORE-PIN DEFLECTION TRANSDUCER

[75] Inventors: Richard Wurst, Williamsburg; Brad H. Watkins, Traverse City, both of Mich.

[73] Assignee: RJG Technologies, Inc., Traverse City, Mich.

[21] Appl. No.: 353,180

[22] Filed: Dec. 9, 1994

[51] Int. Cl.$^6$ ................................................ B29C 45/77
[52] U.S. Cl. ........................... 425/149; 425/468; 425/577
[58] Field of Search .................................. 425/149, 150, 425/468, 577

[56] References Cited

U.S. PATENT DOCUMENTS 3,840,312  10/1974  Paulson et al. .................... 425/149
4,956,143  9/1990  McFarlane ......................... 425/577

Primary Examiner—Tim Heitbrink
Attorney, Agent, or Firm—James M. Deimen

[57] ABSTRACT

A transducer for measuring the amount of lateral deflection taking place at the tip of a core-pin inside a mold or die cavity. Non-uniform cavity pressure and cooling patterns make core-pins prone to deflection resulting in out-of-tolerance thin and thick wall sections of the finished part. The transducer provides a means of determining deflection as it occurs during the molding process for statistical quality control. Real time measurement of the core deflection allows discrimination of unacceptable and reject parts for an automatic part sorting process. In the preferred embodiment a plurality of strain gauges mounted on the core-pin outside of the mold cavity provide real time electric signals of lateral deflection that can be used to automatically segregate reject parts and provide for statistical process control.

4 Claims, 2 Drawing Sheets

MOLD CORE-PIN DEFLECTION TRANSDUCER

BACKGROUND OF THE INVENTION

The field of the invention pertains to the injection molding of hollow plastic articles and, in particular, to preforms for bottles, syringes and other long slender hollow articles having one end closed and the other end open. The hollow interior is typically shaped by a core-pin. In processing the injection molding of parts that utilize a core-pin, such as medical syringes or bottle preforms, the core-pin forms the inner diameter of the part, and ideally maintains the part inner diameter concentric with the outer diameter. Unfortunately, the effectiveness of this pin is influenced by non-uniform fill and pack pressure, and nonuniform cooling gradients across the part wall. The non-uniform pressures and cooling gradients cause the core-pin to deflect off center and upon hardening (cooling) of the part, dimensional requirements of the wall thickness are not met.

SUMMARY OF THE INVENTION

This invention comprises transforming a mold's core-pin into a transducer to measure the quantified deflection occurring at the core-tip. Strain gauges are bonded to the core-pin to sense off-center displacement of the core-tip. Two such strain gauges are located on the core-pin, just outside the mold or die cavity itself, at locations where the strain due to bending can be sensed. The transducer is designed to respond to bending since the tip deflection is related to the bending moment on the core-pin. The use of the transducer allows sensing and monitoring of tip deflection as it occurs in correlation with the filling stage, packing stage, and holding stage of the molding process cycle.

Determination of the magnitude and direction of the tip deflection is accomplished by monitoring two channels of data from the transducer. The transducer has two strain gauge bridges oriented to measure bending in two perpendicular planes. The magnitude and direction of core-tip deflection can thus be determined by data reduction or by electronically combining the signals from these two channels. The magnitude and direction can be continuously monitored, recorded and used to automatically reject defective product. The two strain gauges are oriented such that loads in the axial direction of the core-pin cancel.

A third strain gauge is oriented on the core to sense only axial loads on the core-pin. (This instrumentation is described in co-pending application 08/250,914 assigned to R J G Technologies.) This strain gauge can provide valuable information about the plastic resin pressure in the mold cavity during the filling, packing, and holding stages of the molding process. Further, the signal from this strain gauge can be used for control to switch the molding machine from one stage to another, or for monitoring to assure a quality process. Also, during part ejection the force required to strip the part from the core-pin can be measured.

DESCRIPTION OF THE PREFERRED EMBODIMENTS

Figure 1:
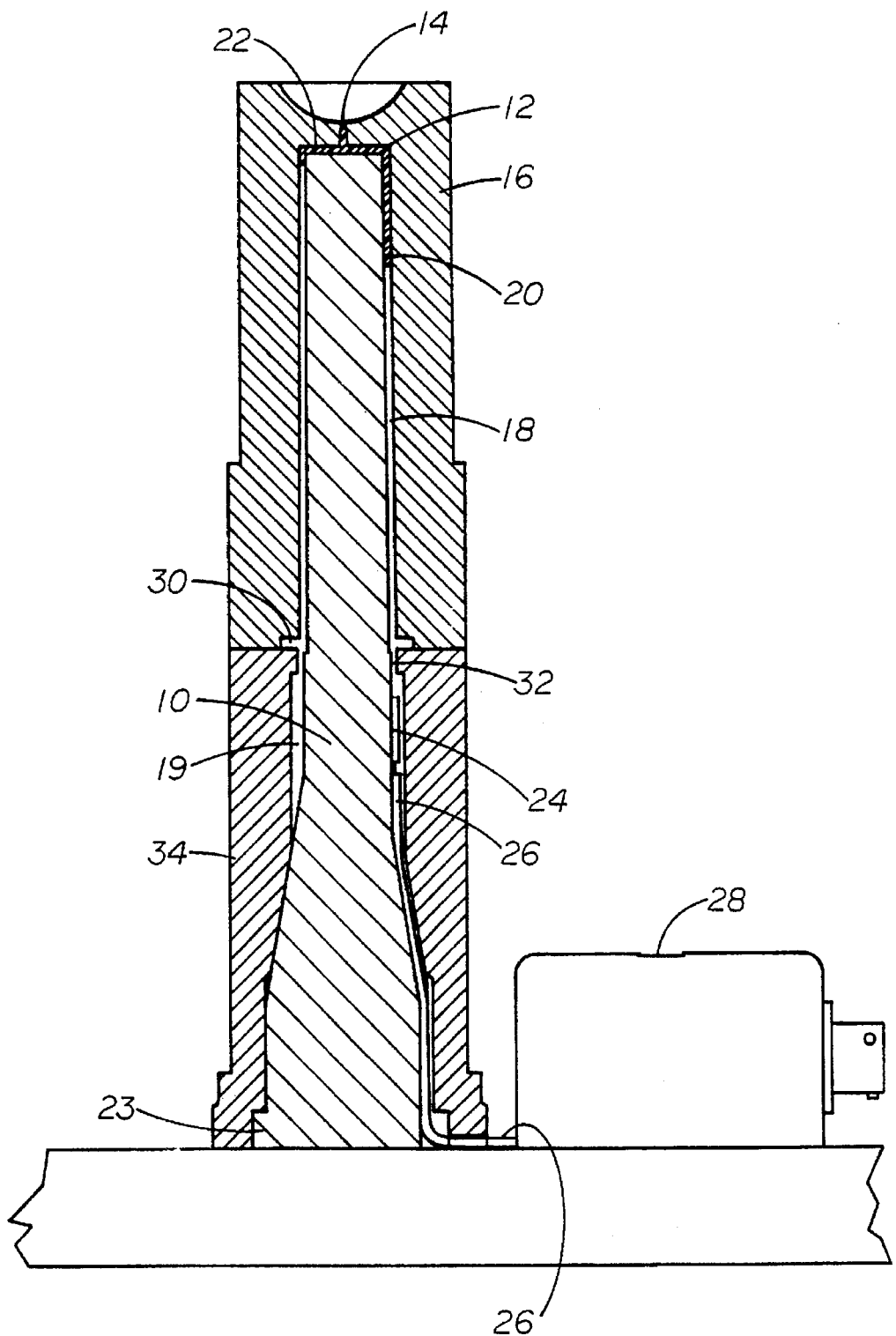
FIG. 1 is a partial cross section of the core-pin/cavity assembly in a mold.

As illustrated in FIG. 1 the core-pin 10 is shown installed in a mold 16 having a top cavity 18. Molten plastic 12 is injected into the mold top cavity 18 at orifice 14 communicating with the top cavity. The plastic 12 flows over the core-pin 10 and fills the top cavity 18 to form the finished part. As the molten plastic flows over the core-pin 10 non-uniform pressure caused by uneven flow or non-uniform cooling may be applied in one side of the top cavity 18 resulting in non-uniform plastic flow about the core-pin 10 as illustrated at 20.

As a result of the non-uniform lateral pressure caused by the non-uniform plastic flow, a bending moment is applied to the core-pin 10 causing the core-tip 22 to deflect laterally relative to the core-pin base 23. Bending stresses in the core-pin 10 are sensed by means for detecting deflection such as the strain gauges 24 and 24' located on the core-pin 10 in cavity 19 beneath the top cavity 18.

The strain gauges form elements of Wheatstone bridges to ascertain deflection by means of electric signals. Other devices for detecting deflection can be employed, i.e., piezoelectric elements, electro-mechanical indicators or other solid state devices. For simplicity, only strain gauge 24 is shown in FIG. 1. Signals from the strain gauges 24 and 24' are conveyed by leadwires 26 extending from the strain gauges on the core-pin 10 to a junction box 28. The junction box 28 can enclose integral amplifiers or other signal conditioning for the strain gauge signals.

At the mold cavity end 30 opposite the orifice 14 there exists a small diametral clearance 32 between the core-pin 10 and the mold sleeve 34. The clearance 32 although small enough to prevent the molten plastic from entering the instrumented area in cavity 19, is large enough (about 0.001 inches) to allow significant deflection of the core-tip 22 before the core-pin 10 contacts the core sleeve 34.

Figure 2:
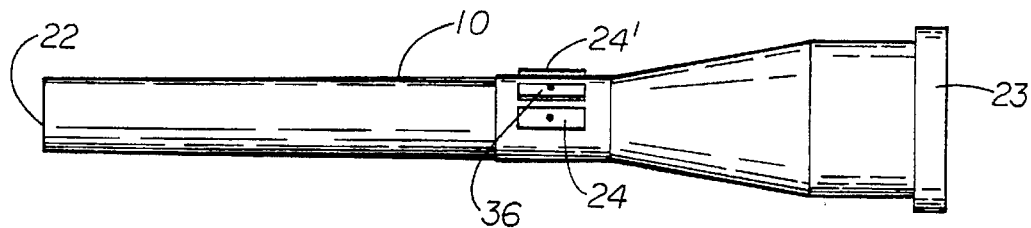
FIG. 2 is a side view of the core-pin deflection transducer.
Figure 3:
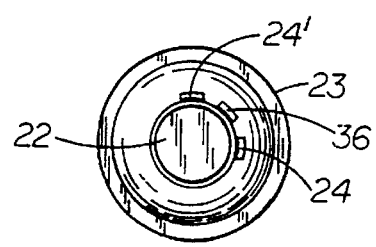
FIG. 3 is an end view of the core-pin deflection transducer.
Figure 4:
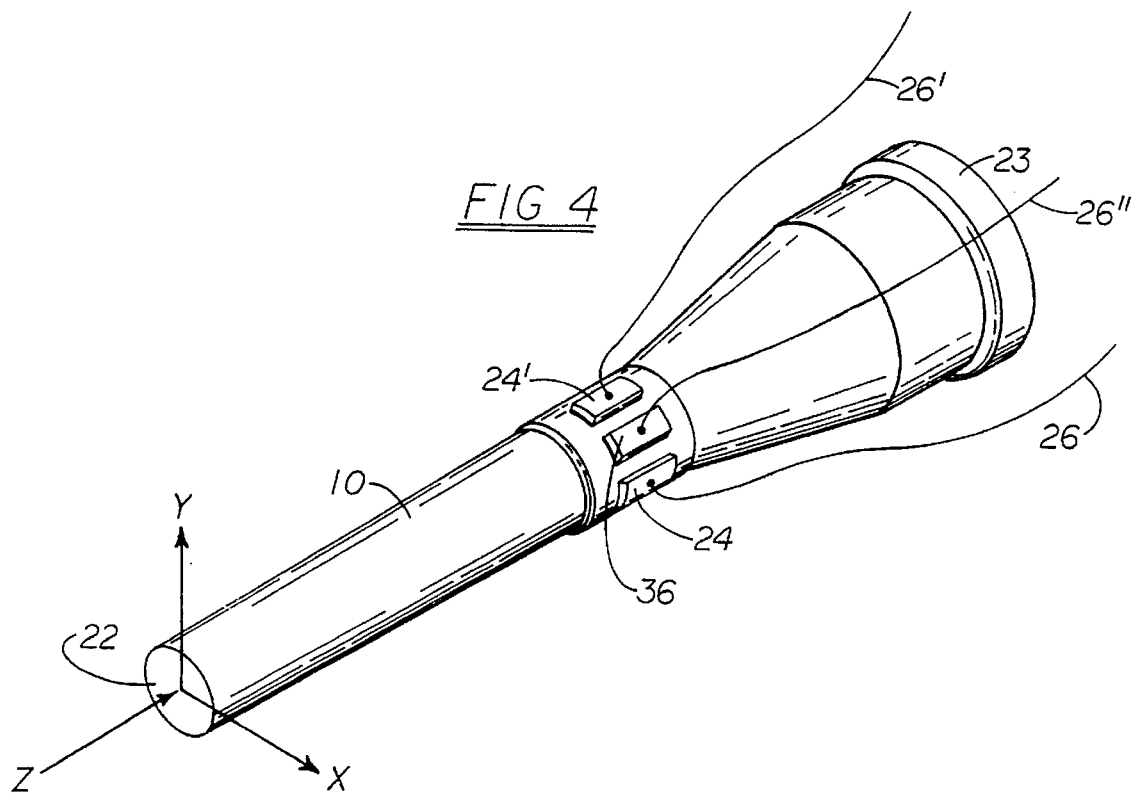
FIG. 4 is a perspective view illustrating the forces and deflections measured by the transducer.

In FIG. 2, FIG. 3 and FIG. 4, side, end and perspective views respectively of the core-tip 22 deflection transducer are shown. A third strain gauge 36 is located in cavity 19 with the strain gauges 24 and 24'. The third strain gauge 36 is oriented to sense axial loads on the core-pin 10. During the filling stage of the molding cycle, molten plastic enters the cavity and pushes axially on the core-tip 22. The strain gauges 24, 24' and 36 respond linearly to the applied force of the plastic entering the cavity. FIG. 4 shows the potential tip deflection of the core-tip 22 in the "X" and "Y" directions (perpendicular axial planes). Strain gauges 24 and 24' sense the core-tip 22 deflection in the "X" and "Y" directions and generate signals through first and second electrical communication channels by means of leadwires 26 and 26' to the junction box 28 and there beyond for conditioning and processing. Similarly, the generation of the signal through a third electrical communication channel corresponds to the axial compressive strain Z from the force of the plastic against the core-tip 22. This signal is also routed through a leadwire 26" to the junction box 28 for further conditioning.

Therefore, the plastic pressure in the cavity can be computed from the known applied force, and the projected area of the core-tip 22 (channel 3). The plastic pressure detected with strain gauge 36 represents the 'gate' or beginning of fill pressure in the mold cavity. For the purpose of controlling the molding process, gate pressure is the preferred measurement. This information can be used to accurately control the injection process if three stage molding is desired. The same strain gauge 36 can be used to determine the force required to remove the molded part from the core-pin 10 after the part cools and the mold opens.

The advantage of the use of the real time measurement of compressive strain with strain gauge 36 is that by controlling the molding process, the number of rejected parts is reduced.

Thus, strain gauge 36 permits more accurate process timing. Strain gauges 24 and 24' permit more accurate measurement of core-pin 10 lateral deflection enabling more accurate set-up and modification of the mold and core-pin to bring the plastic products within specification, permit real time measurement and rejection of parts during production and signal mold failure when the rejection rate reaches a statistical predetermined limit. Expensive and time consuming post molding inspection can thereby be reduced or eliminated.

We claim:

1. A core-pin deflection transducer for use in a mold, the core-pin having a core-tip end, a base, a first portion near the core-tip end for placement in a mold during a molding process, a second portion near the base, an intermediate portion between the first portion and the second portion, means for detecting lateral deflection of the core-tip end disposed on the intermediate portion of the core-pin, a core sleeve adjacent the mold, the core sleeve surrounding at least the intermediate portion of the core-pin, and small diametral clearance between the core-pin and at least a portion of the core sleeve, said clearance of insufficient size to permit flow of plastic therethrough.

2. The core-pin deflection transducer according to claim 1 wherein the intermediate portion of the core-pin has a cavity between the core-pin and the core sleeve.

3. The core-pin deflection transducer according to claim 2 wherein the core-pin intermediate portion has a diameter and the cavity between the core-pin and the core sleeve is a circumferential cavity.

4. The core-pin deflection transducer of claim 1 wherein the means for detecting lateral deflection of the core-pin are disposed within the cavity between the core-pin and the core sleeve.

* * * * *